Jan. 26, 1954
F. A. JONES
2,667,361
UNDERSLUNG VARIABLE RATE SPRING ASSEMBLY FOR TRAILER TRUCKS
Filed Dec. 26, 1951
5 Sheets-Sheet 1
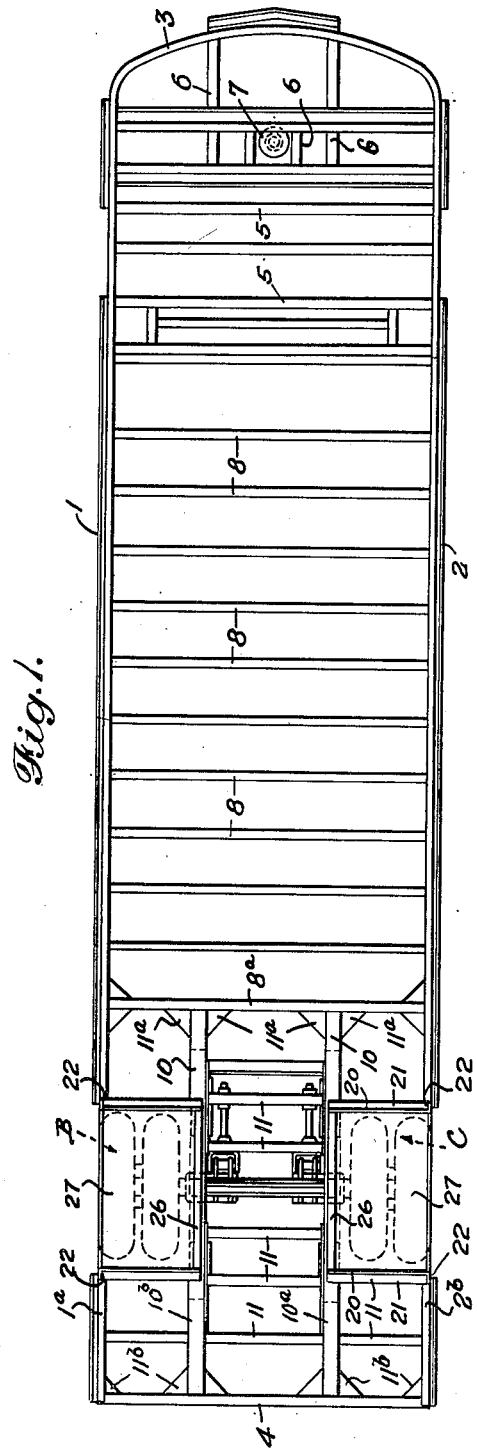
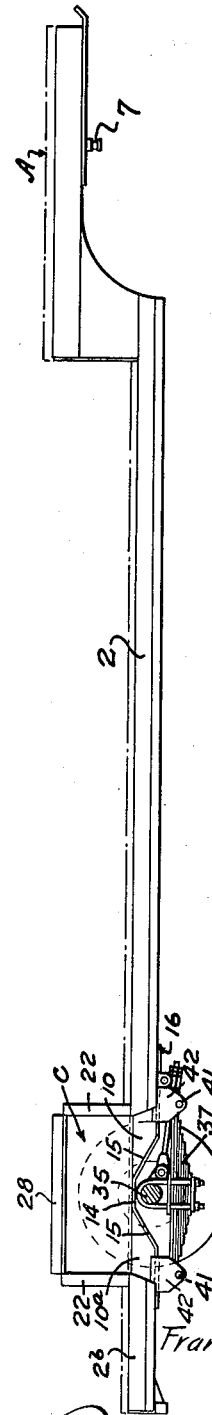
INVENTOR
Frank A. Jones.
BY Ralph T. Barrett
ATTORNEY Jan. 26, 1954
F. A. JONES
2,667,361
UNDERSLUNG VARIABLE RATE SPRING
ASSEMBLY FOR TRAILER TRUCKS
Filed Dec. 26, 1951
5 Sheets-Sheet 2
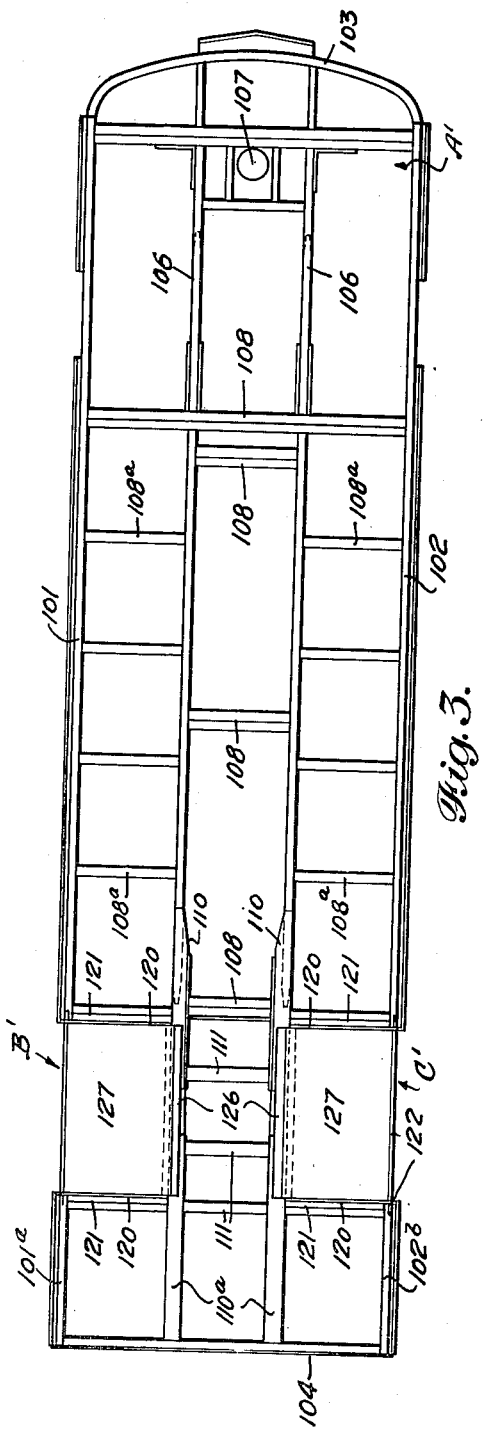
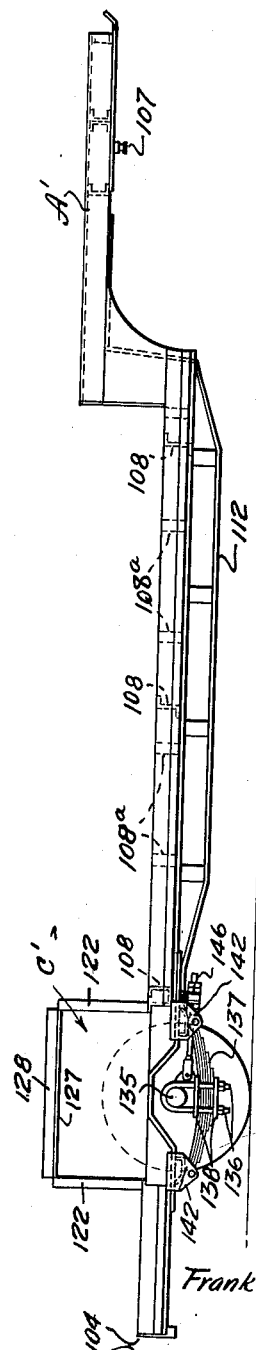
INVENTOR
Frank A. Jones
BY
ATTORNEY Jan. 26, 1954

F. A. JONES

UNDERSLUNG VARIABLE RATE SPRING
ASSEMBLY FOR TRAILER TRUCKS 2,667,361

Filed Dec. 26, 1951

INVENTOR
Frank A. Jones.
BY
ATTORNEY

Jan. 26, 1954
F. A. JONES
2,667,361
UNDERSLUNG VARIABLE RATE SPRING
ASSEMBLY FOR TRAILER TRUCKS
Filed Dec. 26, 1951
5 Sheets-Sheet 4
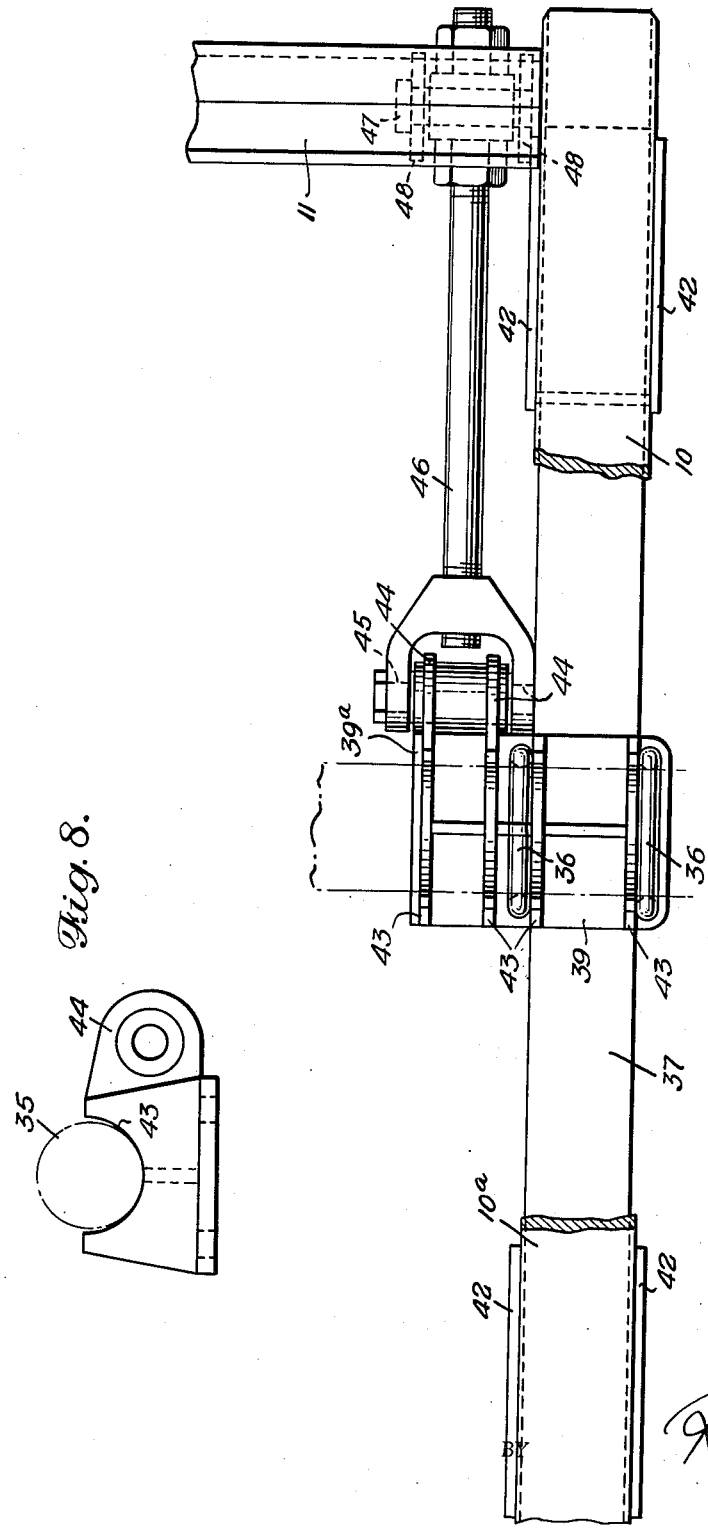
INVENTOR
Frank A. Jones.
BY
ATTORNEY INVENTOR
Frank A. Jones
ATTORNEY Patented Jan. 26, 1954

2,667,361

UNITED STATES PATENT OFFICE 2,667,361

UNDERSLUNG VARIABLE RATE SPRING ASSEMBLY FOR TRAILER TRUCKS

Frank A. Jones, Bristol, Tenn., assignor to Enterprise Wheel and Car Corporation, Bristol, Va.

Application December 26, 1951, Serial No. 263,188

9 Claims. (Cl. 280—106.5)

This invention relates to a trailer having an underslung variable rate spring assembly providing a simple sturdy structure in which the weight for capacity is held to a minimum and at the same time furnishing maximum loading space.

Conventional freight carrying trailers as manufactured have a relatively high center of gravity which repeatedly has proven detrimental to the handling of the conveyances due in part to the relatively great distance between the source of power and the supported mass. Repeatedly efforts have been made to lower the center of gravity in trailers and such efforts have resulted in so obstructing the floor surface that the loading and unloading of cargo is difficult and impractical. Due to the length of the trailer structures it is necessary that the framing of the trailer be relatively heavy and normally the framing and particularly the load supporting sills are in the form of integral beams extending from end to end of the trailer structure. In the present development the center of gravity is lowered by interrupting the sills to provide for an arch structure of suitable fabrication and comprising wheel and axle hoods, the interrupted sills in no way decreasing the strength of the structure as to draft and the vertical load capacity.

One of the objects of the present invention is to provide the lowest possible floor height at the rear end of the trailer for increasing loading capacity and simultaneously lowering the center of gravity.

A further object of the invention is to increase to a maximum the lowering of the floor level without necessitating an offset in the floor over the axle, whereby obstructions to loading and unloading operations are materially lessened.

Other objects of the invention reside in the provision of maximum lateral clearance between the wheel housings; providing a proper spring assembly with the centers of the springs directly under and parallel to the frame of the trailer to avoid twisting of the frame by the spring hangers; to provide in the structure an axle saddle with a radius rod attachment bracket integral with the saddle and inwardly disposed from the springs; and finally to provide radius rods substantially parallel to the springs to hold misalignment to a minimum during upward and downward movement of the axle.

Other features and objects of the invention will more clearly hereinafter appear by reference to the accompanying drawings forming a part of the application, in which like characters of reference designate corresponding parts throughout the several views, in which:

Fig. 1 is a top plan view of the underframing of a trailer built in accordance with the present invention and in which the top of the wheel housing is removed;

Fig. 2 is a side elevation;

Fig. 3 is a top plan view of a modified form of trailer structure with the top of the wheel hoods in position;

Fig. 4 is a side elevation of the structure of Fig. 3;

Fig. 7 is a top plan view of the radius rod and frame assembly;

Fig. 8 is a detail of the saddle structure; and

Figure 5:
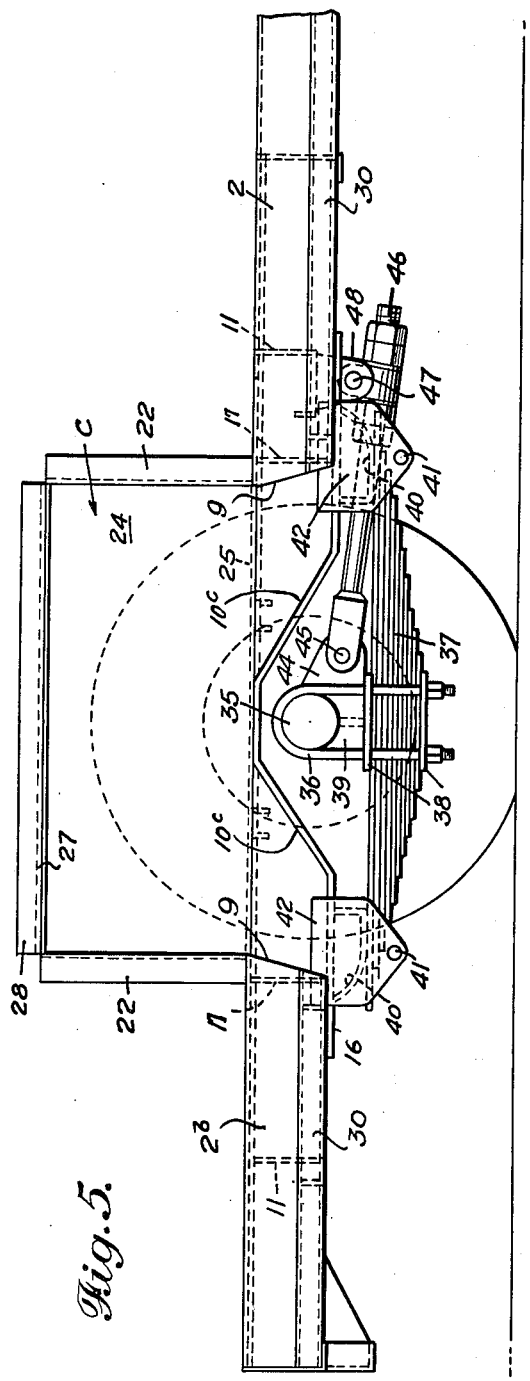
Fig. 5 is a fragmentary elevation of the wheel housing and spring suspension under loaded conditions.
Figure 6:
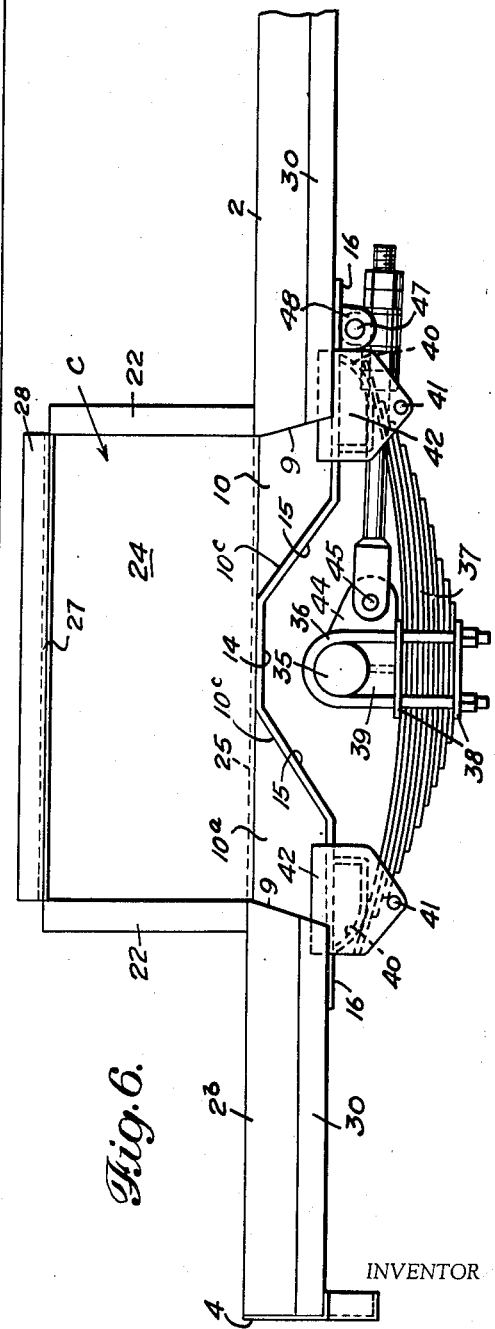
Fig. 6 is a similar view showing the spring and radius rod in unloaded position.

Two basic forms of trailer frames are illustrated, the first frame being shown in Figs. 1 and 2 and the second in Figs. 3 and 4. In Figs. 1 and 2 the structure embodies the outer frame or side sill elements 1 and 2 and their extensions 1$^a$ and 2$^b$, and end connections 3 and 4. At the forward end of the trailer there is provided the conventional coupling arch A embodying a multiplicity of transverse braces 5, with draft connections 6 properly positioned to lend suitable stability to the assembly and particularly at the point of the coupling 7. The main body span has transverse framing elements 8, shown as substantially equally positioned longitudinally of the structure, and connecting the main side sill elements 1 and 2 to approximately the position of the rear wheel housings, indicated generally by reference characters B and C in Fig. 1.

The innermost transverse frame element of the main frame assembly is indicated by reference character 8$^a$, is substantially heavier than the other spans 8, and forms the support for the load carrying auxiliary center or load carrying sill elements 10, 10$^a$, and 10$^b$. At each side of a center line of the axle of the trailer body, the sill members 1, 1$^a$, 2 and 2$^b$ are interrupted and provided with upwardly and inwardly converging angular faces 9 (Fig. 9) which define lower portions of wheel housings to be hereinafter described, and embodying fabricated wheel hoods. Positioned inwardly of the outer frame members or sills 1 and 2, and their extensions 1$^a$ and 2$^b$, are load supporting center sills 10, 10$^a$, and 10$^b$, the reference character 10 indicating the inner portions of these sills and the reference characters 10ᵃ and 10ᵇ indicating the rear portions of these load supporting sills which are interrupted as in the case of the outer sills 1, 1ᵃ, 2 and 2ᵇ. The position of the load supporting sills 10, 10ᵃ and 10ᵇ is parallel to the outer sill structures and their outer edges substantially define the inner walls of the wheel housings B and C. The separated sill structures 1—1ᵃ, 2—2ᵇ, and 10—10ᵃ—10ᵇ are cross braced both fore and aft of the wheel housing structures by transversely extending flanged channel elements 11, Z-beams 71ᵃ and inverted U braces 72. Shear plates 11ᵃ are provided where desirable to lend rigidity to the assembly. The cross bracing and use of shear plates embodies connections with the frame parts with the rear cross element 4 and the transverse frame element 8ᵃ as best shown in Fig. 1.

The arrangement of the frame elements as outlined above provides openings defining frames for wheel housings, the interrupted sills 1—1ᵃ and 2—2ᵇ defining the outer housing opening, while the interrupted inner sills 10 provide clearance for movement of the axles. The structure of the trailer frame embodies as defined above two rigid frame assemblies held together by means constituting wheel and axle housings, with the spring suspension interposed therebetween and transmitting the vertical load to the two frame sections. The draft between the two sections is provided by suitable braces and fabricated wheel housings, the latter inherently being constructed and arranged to supply additional draft strength.

From an inspection of Fig. 2 it will be noted that the top of the wheel housing is substantially in a plane with the top of the coupling arch at the forward end of the trailer, and that the mounting of the spring is below the axle, and the springs and radius rod connections are suspended inward of the outer sills 1, 1ᵃ, 2 and 2ᵇ and below the load supporting sills 10 of Fig. 1. This structure and arrangement is shown in detail in Fig. 9.

The inner adjacent ends 10ᶜ of the center sill structure 10, 10ᵃ and 10ᵇ are more closely positioned than the faces 9 of the outer sill or frame to provide axle clearance, these ends 10ᶜ being sheared at an angle to converge upwardly as shown. Reinforcing the structure at this point, primarily for draft purposes, are arched plates of the same width as the adjacent sill ends, these arched plates including a flat medial portion 14 having its upper surface lying flush with the upper surface of the beam 10, 10ᵃ and 10ᵇ and the diverging arms 15 engaging the angle faces 16 10ᶜ of the beam ends, and defining extremities 16 lying flush against the bottom face of the bottom of beam 10, 10ᵃ and 10ᵇ. Each of the auxiliary sills 10 when assembled includes the reinforcing arch 14—15—16 and the contacting parts of this structure are welded at points of junction with the associated beam as is customary in such assemblies. Vertical walls 17 and 18 are located at the ends of the sectional sills 1—1ᵃ and 2—2ᵇ and form heavy tie members immediately below the wheel housings and forming in fact portions of the wheel housings. The ends of the sills 1—1ᵃ and 2—2ᵇ are sheared at an angle as shown at 9, flaring downwardly and outwardly in the direction of the widest diameter of the wheel to provide clearance therefor. The wheel housings per se are fabricated from end plates 20 which are outwardly flared at 21 and 22 at their bottom and outer edges for connection with the Z-shaped inner longitudinal wall 24, the lower flange 25 of which overlies and is welded to the upper surface of angle plate 15 intermediate the cross braces 11ᵃ, and providing with the top arch structure 14 a laminated fabrication across the beam depression or arch. The upper angle of the longitudinal inner plate 24 indicated at 26 extends inwardly and forms a supporting surface for the adjacent edge of the top plate 27 of the housing structure. The top plate 27 of the housing structure is flanged at its outer edge at 28 for connection with the adjacent truck frame structure. The dimension of the wheel hoods is such as to permit proper freedom of movement of the wheel as the result of movement of the axle in its spring suspension to be later described.

Figure 9:
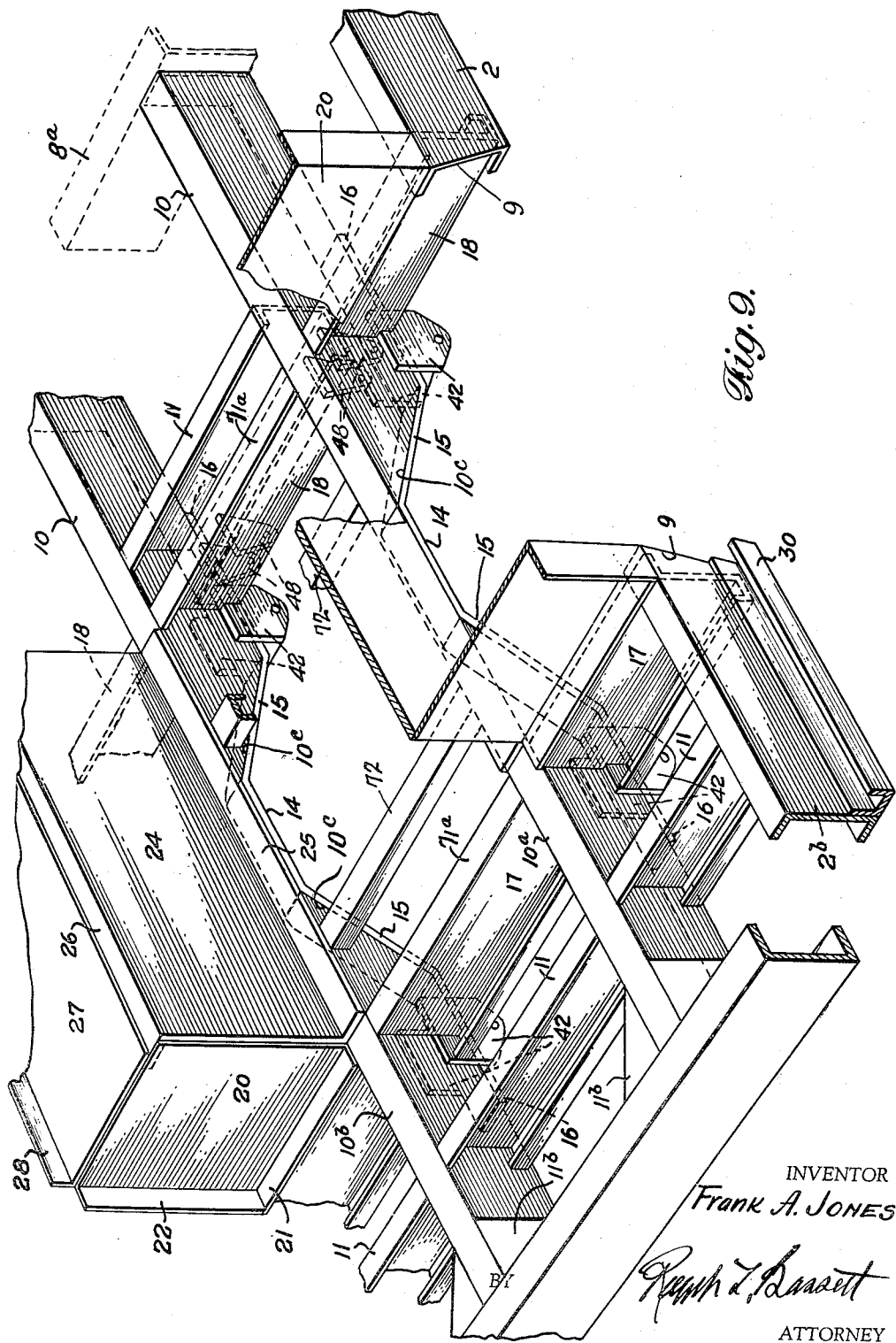
Fig. 9 is a perspective of the wheel housing and frame assembly.

It will be noted that the outer framing indicated by reference characters 1—1ᵃ, 2—2ᵇ, and 3—4 is formed with inwardly facing channels and that along the bottom marginal edges of the frame structure are the U-gutters or finishing strips 30 best shown in Fig. 9. The cross brace members 71ᵃ are of Z-form with the lower flange of each of the Z's bent upwardly into U-form to add to the structure and to provide supporting areas for the spring supports.

The spring suspension for the axles 35 includes the supporting inverted U-clips 36 which are spaced at each side of the laminated spring structures 37 and over the axle and are clamped about these springs by clamp plates 38. The clamp plates 38 are formed with necessary perforations for the legs of the inverted U-clips 36 and the upper clamp plate 38 abuts against the lower surface of the axle saddle 39. The axle saddle 39 has its upper face formed of spaced concave walls 43 to form a support for the lower face of the axle 35. The axle saddles have inwardly projecting extensions 39ᵃ from which project the spaced pierced ears 44 for supporting the pins 45 on which the radius rods 46 are mounted. The springs 37 have their end extremities supporting the bearing shoes 40 and the bottom faces of the spring extensions are confined between the lower faces of the bearing shoes 40 and the transverse spring pins 41. The spring pins 41 extend from sidewall to sidewall of the spring clips 42, these clips being best shown in Fig. 9 and embracing the outer vertical faces of the adjacent face portions of auxiliary sills 10 and the arch extremity 16. The walls of spring clips 42 likewise abut against the adjacent end portions of the Z-sills 71ᵃ and these various faces at their junction with the clips 42 are welded to provide against displacement in any direction as will be obvious to one skilled in the art and form substantial supporting structures for these spring extremities. The outer ends of the radius rods 46 are suspended by pins 47 extending between the ears 48 projecting from the bottom face of the transverse channel 11. This positions the radius rod inward of the spring assembly as shown best in Fig. 7 and provides a parallel arrangement between the radius rods and springs which holds to a minimum any tendency of misalignment during upward and downward movement of the axles.

By means of the structure described the floor of the trailer is immediately above the axle line and is in a single plane except for the limited area represented by the wheel housings as best shown in Fig. 1. This provides for the movement of lading over a floor area which is substantially without offset which causes considerable difficulty and provides unnecessary obstruction to the trucking of cargoes into and out of the trailer.

In Figs. 3 and 4 the side frames 101 and 102 are connected by the front end frame member 103 of arcuate form and rear end frame member 104. The side sills are interrupted as in the form of Figs. 1 and 2 and have side frame extensions 101ᵃ and 102ᵇ. The spaced center sill structures 106 are likewise interrupted and are completed by extension 110ᵃ. The center sills at their forward ends support the draft structure at 107 and are braced by the framing 108 arranged at suitable distances throughout its length. Additional cross framing 111 is also provided in the area of the interrupted portions of the sills. Framing structure 108ᵃ is provided between the spaced center sills and the side sills and the interrupted sills are further reinforced to provide for the wheel housing by transverse connections 120 and 121. The wheel housings are indicated at B' and C' and the connecting structure between the interrupted portions of the spaced center sills are connected by the flanges 126 of the inner wall of the wheel housing, the top plates of which are indicated by reference character 127 and by arch straps as in the other form. The structure of Figs. 3 and 4 is further modified by provision of the truss framing 112 providing a "fish belly" frame throughout the main span of the structure.

In both forms of the invention the structure embodies two sections, the front section including the coupler arch and the main portion of the body, while the rear section closely approximates the rear end portion of the first section insofar as the related parts are concerned. In other words the rear section includes the rear end of the outer frame and the outer end portions of the outer side frame. The rear section also includes the sill parts 10ᵃ and 10ᵇ, these sill parts being adapted to align with the sill sections 10 of the front section of the assembly and to be connected together by the flanges 25 of the wheel hoods and the angular straps 14—15. The space intermediate the ends of the frames provides for the arrangement of the wheels and axle assembly, the wheels being positioned to be received in the fabricated wheel housing and the connecting axle between the wheels having clearance for vertical movement by virtue of the adjacent end structures of the sills 10—10ᵃ and 10ᵇ. The channel braces 72 are arranged between and connect the outer end portions of the sills, these channels facing downwardly with the webs of the channels abutting the heavy flanges 25 of the wheel housings, and reinforce the adjacent parts and give strength to this reduced structure. It will also be noted that the structure is further braced and reinforced by the novel arrangement of the depending spring supporting ears 42 which are arranged at each side and embrace adjacent parts of the sills and also the flanged bottom portions of the transverse braces 17. Wherever advisable or necessary in order to give rigidity to the structure all of the adjoining faces of the associated parts will be properly welded and the same is true with respect to the various elements of the frame, including the shear plates 11ᵃ and 11ᵇ, which shear plates brace the longitudinal frame and sill elements and transverse frame structure as shown in Fig. 1. The specific detailed arrangement of the braces 8 and 108 may be modified in accordance with the nature of the structure involved, it being obvious to one skilled in the art that the number of such transverse braces and their identical arrangement insofar as the main frame is concerned is a matter which will be determined by such factors as the probable load.

What I claim is:

1. A trailer truck frame including outside and inside sill members, the inside sill members being interrupted at each side of the axle position, springs arranged below and interposed between the adjacent ends of the inside sill members, axle saddles supported upon the springs, an axle supported on the saddles, radius rods connecting each saddle with one end of an inner sill member, said radius rods being located between the springs and extending forwardly from the axle, and a member connecting the adjacent inner ends of the inner sills, said member including a horizontal medial portion and downwardly and outwardly diverging wings, said wings being fixed to the ends of said inner sills.

2. In a trailer truck including a frame, a wheel and axle assembly, spring suspension between the frame and said wheel and axle assembly, said frame including outer side frame members and connecting end members, a pair of load supporting center sills positioned within said frame, said side frame members and the sill members being interrupted to provide transverse clearance for said wheel and axle assembly, and the axle being arranged medially of the free ends of the interrupted frame and sill members, wheel housings for the wheels superimposed upon said frame, said wheel housings including inner longitudinally extending flanges overlying and connecting the free ends of the center sills, and an angular plate member connecting the lower faces of the free ends of said center sills.

3. The structure of claim 2 characterized in that transverse braces connect the outer side frame members, and additional transverse braces are arranged between the wheel housings and connect the sill members.

4. The structure of claim 2 characterized in that the adjacent inner ends of the interrupted outer frame members and load supporting center sills converge upwardly and form seats for portions of said angular plate members.

5. The structure of claim 2 characterized in that the spring suspension includes radius rods which connect the axle to adjacent frame members, the radius rods being spaced between the inner walls of the wheel housings.

6. The structure of claim 2 characterized in that the wheel housings are fabricated and the inner walls of the wheel housings include flanges which form connecting members between the adjacent inner ends of the load supporting center sills.

7. In a trailer truck, an outer frame including sides and ends defining the outer walls of the trailer body, wheels and an axle for said trailer truck, inner load supporting sills arranged inwardly of the wheels and connected together and to the side frames by transverse braces, the transverse braces being arranged fore and aft of the wheels, fabricated wheel housings of rectangular form superimposed upon the side frames, load supporting sills, and transverse connections, said wheel housings including relatively heavy inwardly projecting flanges overlying the sill structures, the side frame and sill structures being interrupted to provide clearance for said wheels and axle, the tops and end walls of the wheel housings having their outer marginal edges flanged, and straps connecting the ends of the interrupted sills and having upwardly offset portions abutting and secured to the inwardly projecting flanges of the wheel housings connecting the interrupted load supporting sills.

8. In a trailer truck assembly including a frame, wheels and axle assembly therefor, spring suspension between the wheels and axle and the frame, and wheel hoods for encasing the upper parts of the wheels, said frame being fabricated in two sections, said sections being arranged in aligned, spaced apart relation for arrangement therebetween of the wheels and axle assembly, said wheel hoods overlying adjacent ends of the frames and forming a connecting medium between the frame sections, and additional connecting straps including medial offset portions secured to the bottom faces of the adjacent end portions of the frame to provide additional draft connection between the frame sections.

9. The structure of claim 8 characterized in that each of the frame sections is provided with a plurality of transverse braces whereby each of the sections is individually structurally self-sustaining.

FRANK A. JONES.

References Cited in the file of this patent

UNITED STATES PATENTS

| Number | Name | Date |
|---|---|---|
| 1,967,425 | Petersen | July 24, 1934 |
| 2,077,710 | Pribil | Apr. 20, 1937 |
| 2,109,177 | MacDonald | Feb. 22, 1938 |
| 2,117,577 | Simning | May 17, 1938 |
| 2,579,003 | Josephian | Dec. 18, 1951 |